Patented Nov. 26, 1935

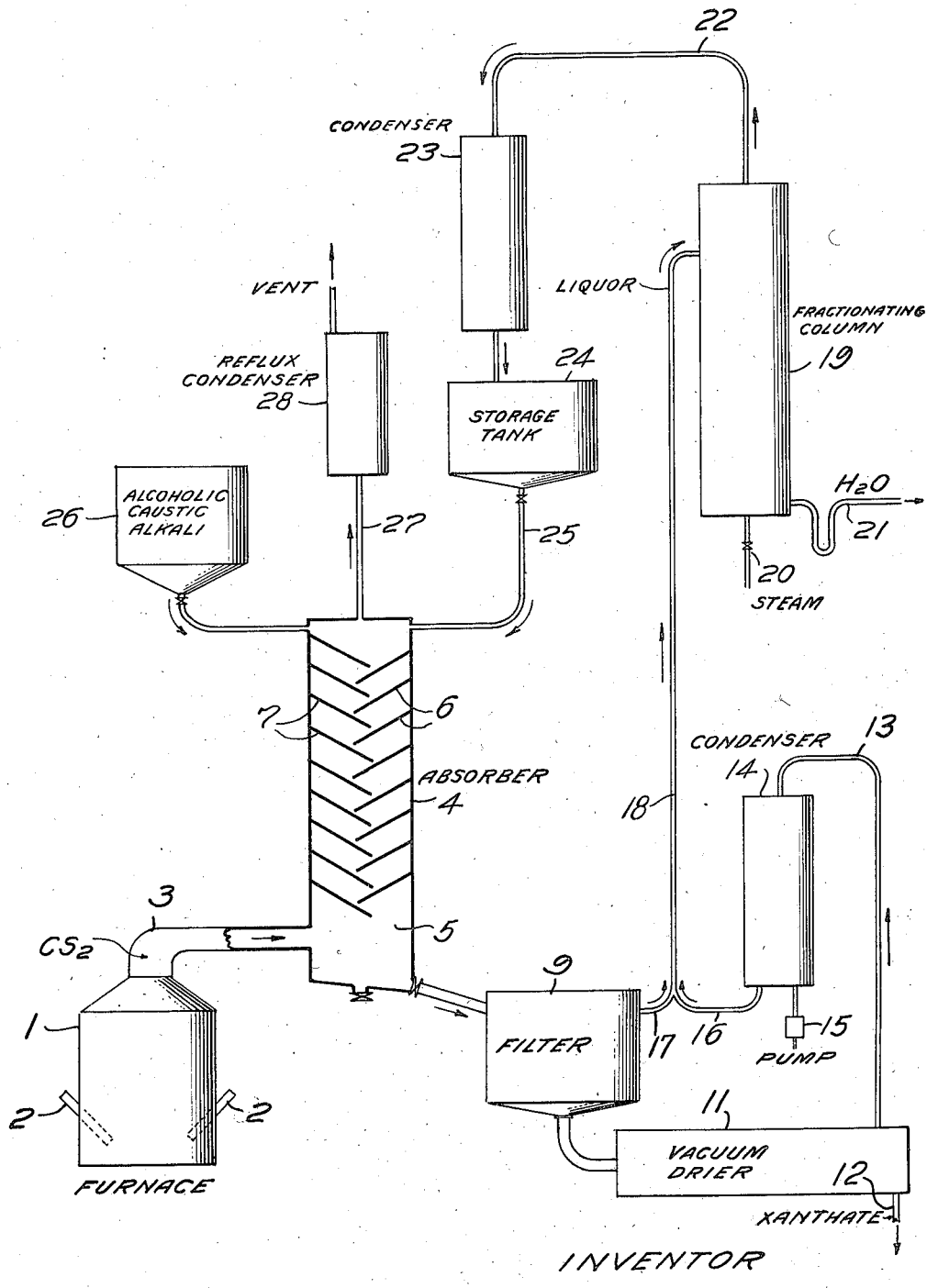

2,021,930

UNITED STATES PATENT OFFICE 2,021,930

PROCESS FOR THE PRODUCTION OF XANTHATES

Ernest D. Wilson, Larchmont, N. Y., assignor to W-B Chemical Company, New York, N. Y., a corporation of New York Application November 3, 1933, Serial No. 696,557

12 Claims. (Cl. 260—99.11)

This invention relates to the manufacture of xanthates of alcohols and more particularly to a new method of producing such compounds. Among the alcohols which may be used are the aliphatic alcohols, including the normal, secondary and tertiary alcohols as, for example, ethyl, iso-propyl, butyl, amyl, secondary and tertiary hexyl and the like. I also include aromatic alcohols, such as benzyl alcohol and cyclic alcohols such as cyclo-hexanol and the like.

As heretofore practiced, it was customary to produce xanthates by dissolving an alkali such as sodium or potassium hydroxide in an alcohol such as ethyl, propyl, butyl or the like, and then adding to the solution a sufficient quantity of carbon bisulphide and then causing the mixture to react to give the xanthate. Various procedures were followed. In some instances the carbon bisulphide was added gradually to the solution which, in some instances, was cold and in other cases was heated. According to other methods a mixture was made of all three substances and the mixture heated for a sufficient length of time to cause the reaction to take place.

In all these prior processes liquid carbon bisulphide was used and although this gave a good product there are a number of disadvantages inherent in the method. One of the greatest disadvantages was a lack of adequate control of the operation in that relatively large quantities and often the entire amount of carbon bisulphide was added to the mixture, which might cause the reaction to proceed violently with loss of material and decomposition of the product.

The present invention is intended to obviate the difficulties encountered in the prior processes, it being among the objects of this invention to provide a method in which the course of the reaction is continuously under adequate control, which is substantially continuous, which does not require the constant supervision of skilled workers and which is economical in operation.

In the practice of my invention I provide an electric or other furnace wherein carbon and sulphur are caused to react to form carbon bisulphide in the vapor state and said vapors are introduced into the lower portion of an absorber where it makes contact with an alcoholic caustic alkali solution or a mixture of alcohol and alkali. Preferably the vapors pass upwardly in countercurrent to the alkali solution and the slurry of xanthate formed by the reaction may now be freed from excess alcohol, as by filtration and drying.

In the accompanying drawing constituting a part hereof, the single figure is a diagrammatic view of an apparatus in which the present invention may be carried out.

I provide a furnace 1 having electrodes 2 therein. Within the furnace carbon and sulphur may be introduced as is well known to form carbon bisulphide in the vapor state, the vapors passing out of the furnace through pipe 3 and into the free space 5 in the absorber 4. The upper portion of the absorber is provided with downwardly inclined alternating baffles 6 and 7 so that a solution or mixture entering the top of the absorber flows down and courses from side to side exposing every droplet to the action of the carbon bisulphide. The resulting product which is a xanthate containing excess alcohol may be filtered in filter press 9 or may be taken directly from the absorber into vacuum drier 11.

The final product is removed from the drier at 12 and the vapors, consisting essentially of excess alcohol and water, pass through pipe 13 and are condensed in condenser 14. A vacuum pump 15 attached to the condenser provides the desired low pressure in the drier. The condensate from condenser 14 passes through pipe 16 and it may be combined with the filtrate flowing through pipe 17 from filter 9, and the combined liquid, which is principally alcohol and water, passes through pipe 18 into fractionating column 19. Steam through pipe 20 is introduced into the column to evaporate off the alcohol and the residual water passes out through pipe 21.

Purified alcohol vapors pass through pipe 22 and into condenser 23 and the liquid alcohol is now placed in storage tank 24, from which it may pass through pipe 25 into the absorber 4. An alcoholic caustic alkali solution 26 is also caused to flow into the top of absorber 4. It is of course obvious that in place of introducing the two solutions into the absorber they may be combined and but a single solution may be introduced.

Any vapors arising in absorber 4 pass through pipe 27 and into reflux condenser 28 where the vapors are liquefied and returned to the absorber.

It is obvious that certain variations in this apparatus may be made without departing from the scope of the invention. For example, the filtration step may be omitted and the xanthate alcohol slurry run by a suitable conduit (not shown) directly into the drier. The absorption of carbon bisulphide may be made to take place in a tank or several tanks containing the mixture or solution of caustic alkali and alcohol.

From the above description of my invention it will be apparent that numerous advantages are inherent in my invention. It is practical to regulate the amount of vapors entering the system through pipe 3 and this allows very close control of the reactions resulting in the production of the xanthate and it also allows of widely varying the conditions of operation depending upon the character of the alcohol used, the strength and character of the alkali and various other factors. Another important advantage is the fact that by my process I use the vapors of carbon bisulphide as a reactant and I obviate the necessity of condensing them prior to use. The condensation of these vapors involves many difficulties and considerable expense both of which are eliminated by the present invention.

The continuous operation, which does not require skilled supervision and which requires only the services of unskilled workmen, lends itself to quantity production with a small apparatus and at a small cost. The system which is employed for recovering and purifying the excess alcohol further aids in the efficiency of the operation. If the present process is operated in conjunction with an alcohol distilling plant it is not necessary to provide any of the described alcohol recovery apparatus, but the alcohol and water solution and the alcohol vapors may be caused to flow into the general alcohol distillation apparatus where the alcohol is freed from water and is recovered. In this way the cost of the xanthate apparatus is greatly reduced.

In prior processes where liquid carbon bisulphide was used, it had been customary to first subject the same to a relatively costly purification operation. In the present process I may use the crude vapors of carbon bisulphide as they are produced in the electric furnace without any subsequent purification thereof, and I obtain a good product therewith.

The details of the process may be varied at will. I may first absorb the carbon bisulphide in alcohol and then react it with the alkali. Or I may provide the solution of carbon bisulphide in alcohol and a solution of alkali in alcohol and mix the two solutions. An excess of alcohol need not necessarily be present in all cases, and in such instance a substantially dry product is obtained directly with the necessity only of driving off a little water, if desired. In some cases a mixture of vapors of alcohol and carbon bisulphide may be brought into contact with solid alkali or a solution thereof. These and other changes may be made in my new process within the scope of this invention.

What I claim is:

1. A method of making xanthates which comprises producing vapors of carbon bisulphide and contacting the same with a liquid, monohydric alcohol and a caustic alkali, whereby a reaction takes place with the formation of a xanthate.

2. A method of making xanthates which comprises producing vapors of carbon bisulphide, contacting the same with excess of a liquid, monohydric alcohol and a caustic alkali, whereby a reaction takes place with the formation of a xanthate, and separating the xanthate from the excess alcohol.

3. A method of making xanthates which comprises producing vapors of carbon bisulphide, contacting the same with an excess of a liquid, monohydric alcohol and a caustic alkali, whereby a reaction takes place with the formation of a xanthate, separating the xanthate from the excess alcohol and returning said alcohol to the system.

4. A method of making xanthates which comprises producing vapors of carbon bisulphide, contacting the same with an excess of a liquid, monohydric alcohol and a caustic alkali, whereby a reaction takes place with the formation of a xanthate, separating the xanthate from the excess alcohol, removing water from said alcohol and returning the same to the system.

5. A method of making xanthates which comprises producing vapors of carbon bisulphide in an electric furnace and contacting the same with a liquid, monohydric alcohol and a caustic alkali, whereby a reaction takes place with the formation of a xanthate.

6. A method of making xanthates which comprises producing crude vapors of carbon bisulphide and contacting the same with a liquid, monohydric alcohol and a caustic alkali, whereby a reaction takes place with the formation of a xanthate.

7. A method of making xanthates which comprises heating carbon and sulphur to form carbon bisulphide in the vapor state, and contacting the same with a liquid, monohydric alcohol and a caustic alkali, whereby a reaction takes place with the formation of a xanthate.

8. A method of making xanthates which comprises heating carbon and sulphur to form carbon bisulphide in the vapor state, absorbing the carbon bisulphide by means of a liquid, monohydric alcohol and reacting the same with a caustic alkali, whereby a reaction takes place with the formation of a xanthate.

9. A method of making xanthates which comprises producing vapors of carbon bisulphide, passing the same upwardly through a column, causing a liquid, monohydric alcohol containing a caustic alkali to flow downwardly through said column in contact with said carbon bisulphide, whereby a reaction takes place with the formation of a xanthate.

10. A method of making xanthates which comprises producing vapors of carbon bisulphide, passing the same upwardly through a column causing an excess of a liquid, monohydric alcohol containing a caustic alkali to flow downwardly through said column in contact with said carbon bisulphide, whereby a reaction takes place with the formation of a xanthate, separating the xanthate from the excess alcohol and returning said alcohol to the system.

11. A method of making xanthates which comprises producing vapors of carbon bisulphide, in an electric furnace, passing the same upwardly through a column, causing a liquid, monohydric alcohol containing a caustic alkali to flow downwardly through said column in contact with said carbon bisulphide, whereby a reaction takes place with the formation of a xanthate.

12. A method of making xanthates which comprises producing vapors of carbon bisulphide in an electric furnace, passing the same upwardly through a column, causing an excess of a liquid, monohydric alcohol containing a caustic alkali to flow downwardly through said column in contact with said carbon bisulphide, whereby a reaction takes place with the formation of a xanthate, separating the xanthate from the excess alcohol and returning said alcohol to the system.

ERNEST D. WILSON.